Oct. 6, 1931.          C. S. BRAGG ET AL                1,826,648
                          POWER ACTUATOR
                  Filed Aug. 3, 1929     2 Sheets-Sheet 1

Oct. 6, 1931.  C. S. BRAGG ET AL  1,826,648
POWER ACTUATOR
Filed Aug. 3, 1929  2 Sheets-Sheet 2
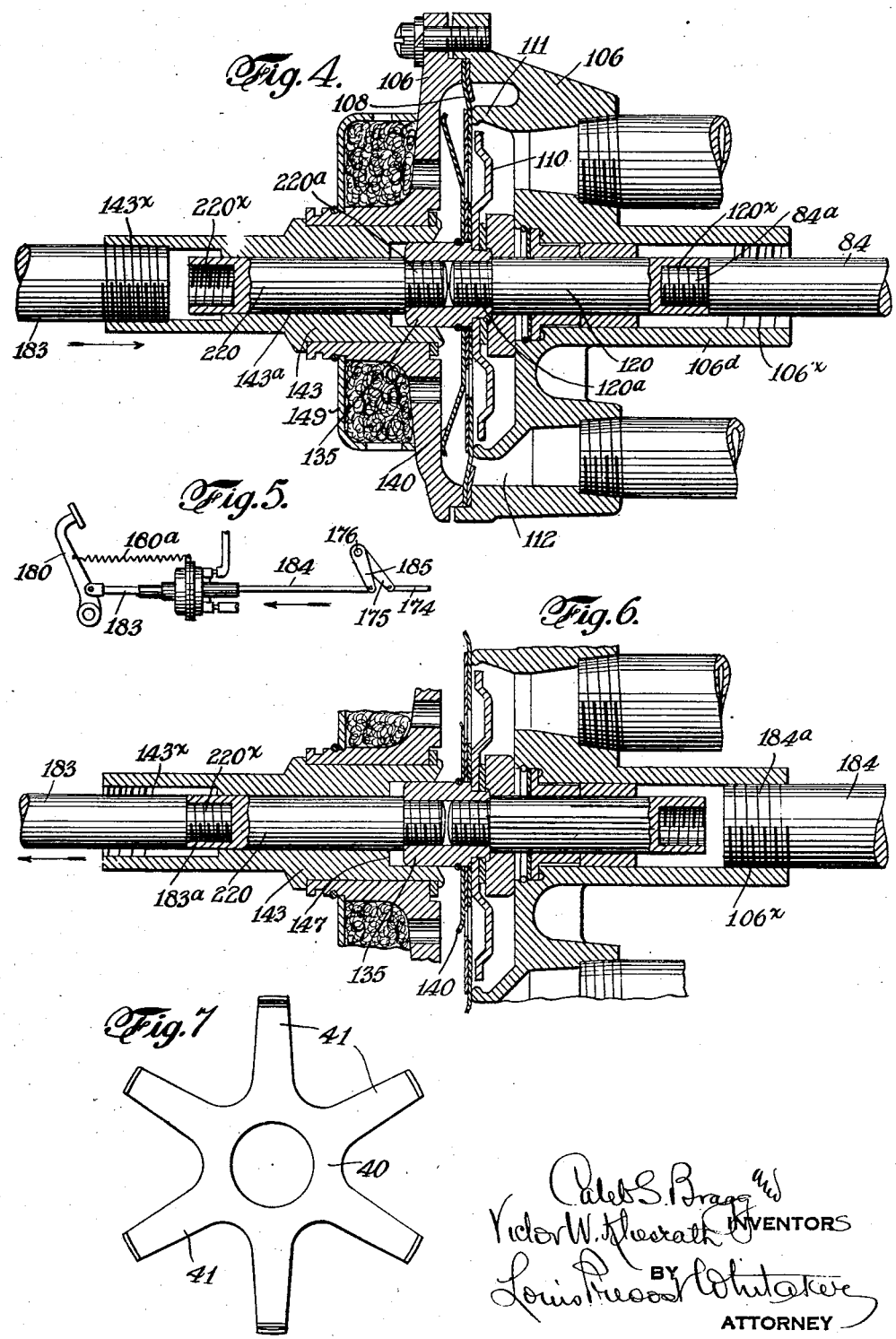

Patented Oct. 6, 1931

1,826,648

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed August 3, 1929. Serial No. 383,221.

Our invention consists in the novel features hereinafter described, reference being had to the accompanying drawings which show several embodiments of the invention selected by us for purposes of illustration, and said invention is fully disclosed in the following description and claims.

Our invention relates to vacuum brake mechanism, and has for its principal object the provision of valve mechanism having portions subjected to the same differentials of fluid pressures as the piston or pistons of the power actuator or actuators controlled thereby, in a direction to resist the movement of the valve mechanism to produce a power stroke of the actuator, and which may be inserted in linkage between a physically operated part, as a pedal lever, and brake mechanism, so that the valve mechanism can be operated by a pushing action instead of a pulling action to effect the power stroke to apply the brakes, and by which the physical force of the operator may be directly applied to the brake mechanism of the vehicle connected with the physically operated part after the actuator has exerted its full power, or in case of failure of power.

Another feature of our invention consists in the provision of means whereby the physical force of the operator may also be directly applied to brake mechanism of the vehicle connected with the physically operated part before the valve mechanism is operated, so as to quickly bring the friction surfaces into contact and apply a predetermined amount of braking force, after which the valve is operated to apply the power of the actuator to the brakes operated thereby, the construction permitting the operator to apply his physical force to a further extent to the brake mechanisms connected with the physically operated part after the valve mechanism has been moved to fully opened position.

Another feature of our invention consists in providing means whereby the same controlling valve mechanism for the actuator may be connected in linkage between a physically operated part and brake mechanism of the vehicle, in which the valve mechanism is to be operated either by a pushing or a pulling action, while at the same time either or both of the foregoing objects are also obtained.

Our invention comprises certain novel features of construction and combination of parts hereinafter described and particularly pointed out in the claims.

Referring to the drawings,

Fig. 4 is an enlarged sectional view of the controlling valve mechanism shown in Fig. 2, constructed so that it may be operated either by a pushing action or by a pulling action, and shown connected so as to be operated by a pushing action.

Fig. 5 is a detail view of a pedal lever connected with a valve such as is shown in Fig. 4, and connected so as to operate the valve by a pulling action.

Fig. 6 is an enlarged view of portions of the valve mechanism shown in Fig. 4, connected as shown in Fig. 5.

Fig. 7 is an enlarged detail view of a spring which we prefer to employ in connection with the valve mechanism.

Figure 1:
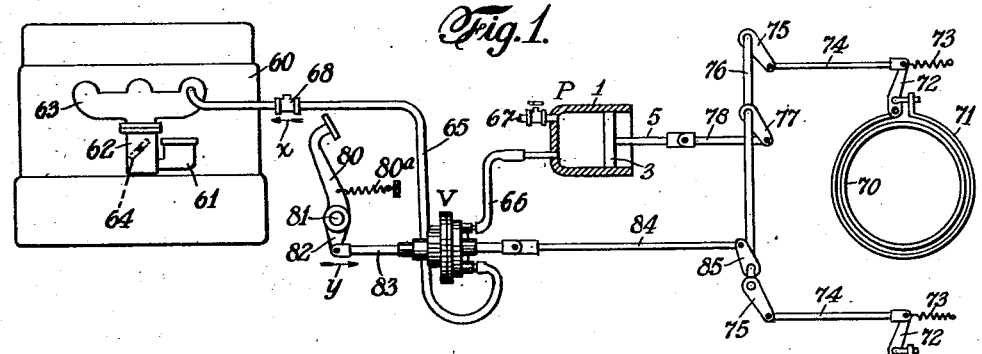
Fig. 1 is a diagrammatic view of a vacuum brake system for automotive vehicles embodying our invention.

Fig. 1 represents diagrammatically a vacuum brake system embodying our present invention, in which the power actuator, P, is of the type in which the piston is submerged in atmosphere when in released position, or as we term it the "air-balanced" type, and the suction is conveniently obtained from the throttle controlled intake manifold of the internal combustion engine for propelling the vehicle or vehicles. 1 represents the actuator cylinder which is closed at one end and open at the other. 3 represents the piston, the piston rod, 5, of which is connected with brake mechanism of the vehicle, being in this instance connected by a link, 78, with an arm, 77, on a rock shaft, 76, having arms, 75, connected by links, 74, with brake applying levers, 72, of the brake mechanisms. The brake mechanisms may be of any preferred type. As shown, each comprises a brake drum, 70, and brake band, 71, operatively connected with one of the levers, 72, and the brake levers, 72, are provided with yielding retracting means for returning the brakes and the piston of the actuator to released or off position, springs, 73, being indicated for this purpose.

60 represents the engine provided with the carburetor, 61, connected by the suction passage, including the vertical passage, 62, and intake manifold, 63, with the engine cylinders, and 64 represents the usual throttle valve for the suction passage.

Figure 2:
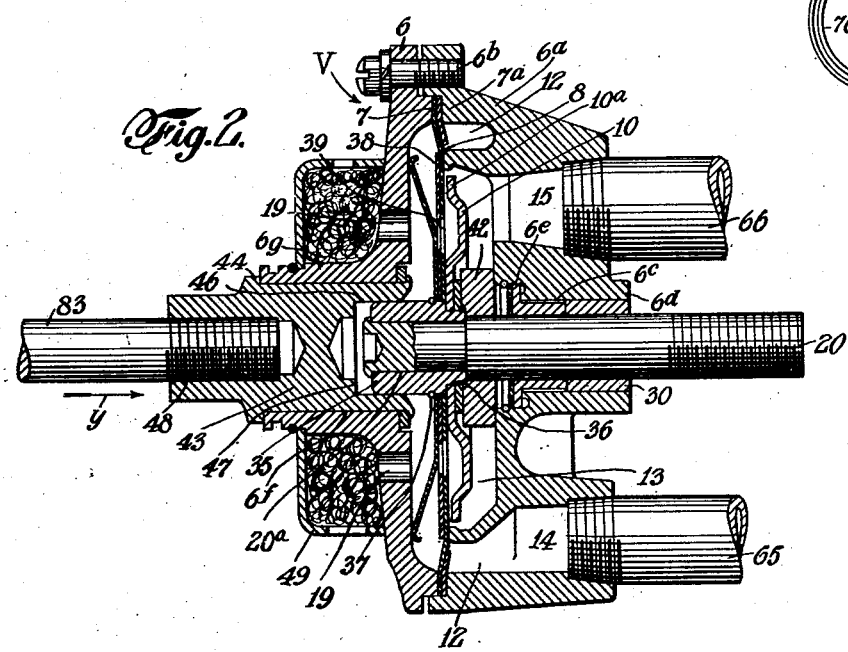
Fig. 2 is an enlarged sectional view of the controlling valve mechanism shown in Fig. 1, and operable by a pushing action.

V represents the controlling valve mechanism shown in section in Fig. 2, for controlling the power actuator or actuators. The valve mechanism is of the kind covered by our former application for Letters Patent of the United States filed November 7, 1927, and given Serial No. 231,724, and comprises the following parts. The casing of the valve mechanism is formed in two parts, 6 and 6$^a$, connected together in any desired way, as by screws, 6$^b$, and each provided with annular clamping portions, 7 and 7$^a$, respectively, for sealingly engaging the marginal portions of a flexible diaphragm, 8, provided with inlet apertures, 18, at all times in communication with the atmosphere, through suitable apertures, 19, in the casing member, 6. The casing member, 6$^a$, is provided with an annular seat, 11, adapted to be engaged by the diaphragm, 8, when in released position, said seat dividing the interior of the casing member, 6$^a$, into a central chamber, 13, and an annular suction chamber, 12, surrounding the same, which are disconnected when the diaphragm is seated. Within the chamber, 13, is a disc valve, 10, having an annular seat, 10$^a$, for engaging the diaphragm, and closing the air inlet apertures, 18, said disc valve being held unseated when in the released position.

The disc valve and diaphragm are connected centrally with a valve actuating part, which according to our present invention extends through an aperture in the casing member, 6$^a$, in rear of the chamber, 13, and as this chamber is connected with the suction chamber during a power stroke of the actuator or actuators, it is necessary to seal the aperture in the casing through which the valve actuating part extends. In this instance the casing member, 6$^a$, is provided with a central aperture, 6$^c$, surrounded by a sleeve portion, 6$^d$, and the inner end of the aperture is surrounded by an annular recess, 6$^e$. We prefer to employ a sealing member shown in detail in Fig. 3, formed of molded rubber, compressed cork, or cork composition, or other suitable material, and having a cylindrical portion, 31, the outer diameter of which sealingly fits the aperture, 6$^c$, and said cylindrical portion is provided at its inner end with an annular projecting flange, 32, to engage the recess, 6$^e$. The sealing member is conveniently held in position by a washer, 33, and a spring locking ring, 34, which engages an annular locking recess in the outer wall of recess, 6$^e$, but it may be secured in any other desired way.

20 represents a longitudinally movable stem or valve actuating part, extending through the sealing member with a sealing fit which permits the longitudinal movement of the stem, 20, therethrough, and the outer portion of the sleeve, 6$^d$, is preferably provided with a metallic guiding collar, 30, held therein in any desired way, and having a guiding engagement with the stem, 20. The inner end of stem, 20, is connected with the central portions of diaphragm, 8, and disc valve, 10. In this instance we have shown a connecting sleeve, 35, having a reduced portion, 36, at one end, forming a shoulder, and adapted to engage the central aperture in the disc valve, 10, to which it is secured by riveting or swaging over the end of the sleeve upon a washer as shown, or in any other desired way. The diaphragm, 8, has a central aperture to fit the larger diameter of sleeve, 35, and is clamped against the central portion of the disc valve by a spring locking ring, 37, as shown, or in any other desired manner. In this instance we have shown interposed between the locking ring and the diaphragm, a thin flexible washer, 38, engaging the central portion of the diaphragm, and of a diameter approximately equal to the diameter of the seat, 11, and provided with apertures, 39, registering with the apertures in the diaphragm. Between the washer, 38, and the spring locking ring, or other connection, is a spring spider 40 (shown in detail in Fig. 7) having spring arms, 41, adapted to engage the inner face of casing member, 6.

The stem, 20, is preferably provided with a reduced portion, 20$^a$, at its inner end, which passes through the connecting sleeve, 35, and is secured thereto by riveting or swaging over the inner end of the stem, as shown, or in any other desired way. This forms a very convenient arrangement for assemblying the stem and connected parts before they are inserted in the valve casing, and a stop collar, 42, is placed on the stem, 20, between the sleeve, 35, and the inner face of the casing member, 6$^a$, to limit the movement of the stem under the action of spring, 40, when the parts are in released position, in which they are shown in Fig. 2.

The casing member, 6, is provided with means for connecting the casing in linkage between a physically operated part, as the pedal lever, and brake mechanism. In this instance we have shown the casing member, 6, provided with an aperture, 6$^f$, surrounded by a sleeve, 6$^g$, to receive an attaching plug, 43, having a flange, 44, to engage the outer end of sleeve, 6ᵍ, the inner end of said plug being riveted or swaged over upon a washer, 45, engaging the inner face of the casing member. The plug, 43, is provided at its inner end with a recess, 46, to receive the sleeve, 35, and a stop shoulder, 47, to engage the end of said sleeve, 35, and limit the lost motion between the valve casing and the stem, 20, in a direction to effect a power stroke and apply the brakes. The sleeve, 6ᵍ, also carries an air strainer, 49, and dust guard, 50.

In Fig. 1 we have shown a pedal lever, 80, pivoted at 81, to the vehicle and having a depending arm, 82, connected by a rod or link, 83, with one of the relatively movable parts of the valve mechanism, while the other part is connected by a rod or link, 84, with an arm, 85, on the rock shaft, 76. In this instance the rod, 83, is connected to the casing by screwing a threaded portion of the rod into a threaded recess in the plug, 43, and the valve actuating part or stem, 20, is threaded and connected in any usual manner with the link rod, 84, but the position of the valve could be reversed, if desired. We prefer to provide the pedal lever with a retracting spring, indicated at 80ᵃ, sufficiently strong to counterbalance the weight of the pedal lever.

The valve casing member, 6ᵃ, is provided with a suction aperture, 14, communicating with the annular suction chamber, and connected by a suction pipe, 65, with the suction passage of the engine, a portion of said pipe being flexible. The casing member, 6ᵃ, is also provided with an aperture, 15, communicating with chamber, 13, and connected by a flexible pipe, 66, with the closed end of the actuator cylinder, 1. The cylinder is preferably provided with a pipe, 67, for connecting another or other actuator cylinder or cylinders for joint control therewith, and the additional cylinder or cylinders may be located upon the same or another vehicle, and connected with brake mechanism. Pipe, 66, is provided with a cock, 67, for closing it when not in use. We also prefer to provide suction pipe, 65, with a check valve, 68, opening toward the manifold, as indicated by the arrow, 69, in Fig. 1.

To effect an application of the brakes the operator will apply his foot to the pedal and depress the same, which will exert a rearward push on the rodding in the direction of the arrow y, Fig. 1. The first effect of this movement of the pedal, which tends to move the valve casing rearwardly with respect to the valve actuating stem, 20, will be received by the spring, 40, the initial resistance of which must be overcome before relative movement between the stem, 20, and valve casing, to operate the valve mechanism, can be effected. The spring, 40, will be given a predetermined resistance, and we make these springs of different resistances, so as to provide for regulating the initial resistance to the operation of the valve mechanism, as desired.

The effect of this resistance spring is that until its resistance is overcome the brake rodding and the entire valve mechanism will move bodily in the direction of the arrow y, thereby applying the physical force of the operator to move the brake mechanisms in a direction to apply them until the resistance encountered equals the resistance of the spring. This may be sufficient to bring the friction parts of the brakes into contact, and to apply a certain amount of pressure thereto, depending on the strength of the spring. Obviously the piston of the actuator will be likewise moved, but there is no resistance to its movement except friction, as the closed end of the cylinder is connected with the atmosphere.

Assuming that the engine is in operation, the vacuum chamber, 12, is evacuated, and the cylinder, 1, forward of the piston, is in communication with the atmosphere through the unseated disc valve and the apertures, 18, in the diaphragm, and the differential of fluid pressures on the marginal portions of the diaphragm tends to hold it seated. As soon as the resistance of spring, 40, is overcome, relative movement between the valve stem, 20, and the valve casing results, and this seats the disc valve on the diaphragm, closing the apertures, 18, and thereafter unseats the diaphragm from seat, 11, connecting the cylinder, 1, with suction, and causing the piston to move to apply the brakes by power. It will be understood that this is a "follow-up" valve mechanism, and that as the movement of the rock shaft by the piston is communicated to the rodding, in which the valve is located, the foot and the pedal lever will follow as the brakes are applied, so that if the downward or forward movement of the pedal is stopped, the piston will cause a relative movement of the valve casing and stem, 20, in the opposite direction to that indicated by arrow y, and permit the diaphragm to seat, without unseating the disc valve, thus enabling the operator to apply pressure to the brakes by the actuator a little at a time, if desired, and hold the brakes at any point as applied.

It will also be understood that as the cylinder of the actuator is evacuated, the space in the valve casing in rear of the diaphragm is evacuated to the same extent, and the increasing differential of fluid pressure on the rear wall of the casing member, 6ᵃ, will be transmitted to the pedal in addition to the resistance of spring, 40, and must be overcome by an exertion of continually increasing force on the part of the operator to keep the valve open, until the brakes are applied to the maximum extent of the power of the actuator. This varying reactionary force enables the operator to determine the extent to which the actuator is applying its power to the brakes.

When the brakes have been applied with the full force of the actuator, the operator, by taking up the lost motion between the valve casing and the valve stem, 20, and further depressing the pedal, can apply his physical force to the brakes connected by the rodding with the pedal. In like manner the operator can apply the brakes entirely by physical force in case of failure of power, as the operation of the valves after the resistance of the spring, 40, is overcome will vent the cylinder through the valve mechanism, for example, to the suction passage of the engine and so to the atmosphere if the engine is not running, or to the atmosphere in case of a broken pipe connection. To release the brake mechanism after a partial or complete application of the brakes, the operator will release the pedal or remove his foot from it altogether, so as to permit the diaphragm to seat and the disc valve to be unseated, thus readmitting air to the actuator cylinder (or cylinders), whereupon the brakes and the actuator piston (or pistons) will be restored to their released positions by the brake retracting means, as the spring, 73.

In some installations it is desirable to operate the valve mechanism by a pushing action, as hereinbefore described, while in others, by reason of differences of construction, it is desirable to operate the valve mechanism by a pulling action.

In Figs. 4, 5 and 6, we have shown a slight modification by which the valve mechanism may be so constructed that it may be inserted in linkage between the brake mechanism and a physically operated part adapted to either push or pull.

In these figures, in which parts corresponding with those previously described are given the same reference numerals with the addition of 100, we accomplish this result in the following manner.

As shown in Figs. 4 and 6, the sleeve, 106$^d$, on the casing member, 106$^a$, is extended beyond the outer end of the valve actuating stem, 120, and is provided with interior threaded portions, indicated at 106$^x$. The outer end of the stem, 120, is provided with an interiorly threaded recess, indicated at 120$^x$. In this instance the inner end of the valve actuating stem, 120, is provided with a threaded portion, 120$^a$, which is screwed into the connecting sleeve, 135, to which the diaphragm and disc valves and the spring, 140, are connected in the manner previously described, the threaded portion 120$^a$, extending only part way through the sleeve, which is interiorly threaded throughout its length. The plug, 143, connected with the casing member, 106, is provided with a central bore, 143$^a$, to receive the threaded end, 220$^a$, of a secondary valve actuating stem, 220, which is in effect a continuation of the stem, 120, but as it is located on the side of the diaphragm and disc valve always exposed to atmosphere, it is unnecessary to provide the stem extension, 220, with a sealing member. The outer end of the extension, 220, is shown provided with an interiorly threaded recess, indicated at 220$^x$. The plug, 143, is extended beyond the end of the extension stem, 220, and counterbored to provide a recess, 143$^x$, which is also interiorly threaded. The other parts of the valve are constructed and operate exactly as hereinbefore described.

Figure 3:
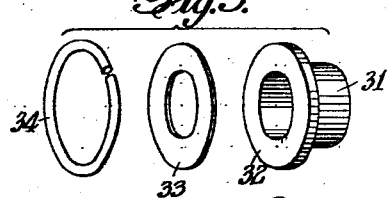
Fig. 3 is a detail view of a form of packing for the valve actuating part, and retaining means therefor, illustrated in Fig. 2.

By constructing the valve in the manner shown in Fig. 4, where it is desired to have the valve mechanism operated by a pushing action, as illustrated in and described with reference to Figs. 1, 2 and 3, the rod, 83, shown in Fig. 1, will be screwed into the threaded recess, 143$^x$, in the plug, 143, and the rod, 84, will be provided with a threaded portion, 84$^a$, which is threaded into the recess, 120$^x$, in the outer end of the valve actuating stem, 120.

Figs. 5 and 6 illustrate the manner of connecting the valve mechanism in the rodding between the brake mechanism and the pedal lever, where it is desired to operate the valve mechanism by a pulling action. In this instance the pedal, indicated at 180 in Fig. 5, is pivotally connected at a point above its pivotal support to a link rod, 183, which as shown in Fig. 6 extends freely through the recess, 143$^x$, in the plug, 143, and is provided with a threaded portion, 183$^a$, which is screwed into the threaded recess, 220$^x$, in the extension, 220, of the valve actuating stem. The link rod, 184, is provided with a threaded portion, 184$^a$, which is screwed into the threaded sleeve extension, 106$^x$, on the casing member, 106$^a$, and is connected to brake mechanism of the vehicle in the manner illustrated in Fig. 5. When the valve is connected in this manner the depression of the pedal lever, 180, will pull the rod, 183, in the direction of the arrow in Fig. 6, and move the valve actuating stem, 220, forwardly with respect to the valve casing, instead of pushing the valve casing rearwardly with respect to the stem. The effect, however, is exactly the same. The physical force exerted on the pedal will be transmitted through the spring, 140, to the valve casing, and through the rod, 184, to the brake mechanism in a direction to bring the friction surfaces into contact and apply the brakes with a predetermined amount of force, depending upon the initial resistance of the spring, 140. As soon as the resistance of the spring is overcome, the disc valve, 110, will be moved into engagement with the diaphragm to first close the connection between the cylinder and the atmosphere, and thereafter unseating the diaphragm, 108, from the annular seat, 111, and connect the cylinder with the suction chamber, 112. The follow-up action of the valve mechanism will be exactly as before described, as the movement of the piston and the rock shaft, 176, in applying the power of the actuator to the brake mechanism will, through the rod, 184, move the valve casing in the direction of the arrow Fig. 6, so as to reseat the diaphragm and hold the brakes as applied after any application of the power of the actuator below the maximum. It will also be understood that the reactionary differential of fluid pressures on the disc and diaphragm corresponding with the differential of fluid pressures on the actuator piston will in this instance be transmitted to the pedal through the stem extension, 220, and rod, 183, and will apprise the operator of the extent to which the power of the actuator is being applied to the brakes. When the full power of the actuator has been exerted, the operator, by further depressing the pedal, 180, and taking up the lost motion between the valve actuating stem extension, 220, and the valve casing, and bringing the sleeve, 135, into engagement with the stop shoulder, 147, on the plug, 143, can apply his physical force directly to the brake mechanism through the rodding in addition to the power of the actuator, and in like manner can apply the brake mechanism by physical force alone in case of failure of power. The release of the brakes is accomplished in the same manner as previously described.

What we claim and desire to secure by Letters Patent is:—

1. In valve mechanism for controlling power actuators, the combination with a valve casing, of a diaphragm valve, a diaphragm engaging seat in said casing providing, when the diaphragm is seated, two compartments, one of which is provided with means for connecting it with a source of suction and the other of which is provided with means for connecting it with a power actuator, said diaphragm being provided with apertures for connecting said latter chamber with the atmosphere, a disc valve in said latter chamber having sealing portions for seating upon the diaphragm and disconnecting said chamber from the atmosphere, a valve actuating part connected with said diaphragm and disc valve, an initial resistance spring interposed between said valve actuating part and a part connected with the casing and holding the valve mechanism in released position, said valve casing and said valve actuating part being connected the one with a physically operable part and the other with brake mechanism of the vehicle, whereby a movement of the physically operable part will be transmitted through said spring to said brake mechanism to effect a partial operation of the same before operating the valve mechanism.

2. In valve mechanism for controlling power actuators, the combination with a valve casing, of a diaphragm valve, a diaphragm engaging seat in said casing providing, when the diaphragm is seated, two compartments, one of which is provided with means for connecting it with a source of suction and the other of which is provided with means for connecting it with a power actuator, said diaphragm being provided with apertures for connecting said latter chamber with the atmosphere, a disc valve in said latter chamber having sealing portions for seating upon the diaphragm and disconnecting said chamber from the atmosphere, a valve actuating part connected with said diaphragm and disc valve, an initial resistance spring spider having its central portion connected with the valve actuating part and provided with spring arms for engaging a part connected with the casing, and means for connecting said casing and the valve actuating part, the one with a physically operable part and the other with brake mechanism of the vehicle.

3. In valve mechanism for controlling power actuators, the combination with a valve casing, of a diaphragm valve, a diaphragm engaging seat in said casing providing, when the diaphragm is seated, two compartments, one of which is provided with means for connecting it with a source of suction and the other of which is provided with means for connecting it with a power actuator, said diaphragm being provided with apertures for connecting said latter chamber with the atmosphere, a disc valve in said latter chamber having sealing portions for seating upon the diaphragm and disconnecting said chamber from the atmosphere, a valve actuating part connected with said diaphragm and disc valve and extending through an aperture in said casing on the side of the diaphragm adjacent to said suction connection, sealing means for said aperture interposed between the casing and said valve actuating part, and means for connecting said valve casing and said valve actuating part, the one with a physically operable part and the other with a part connected with the vehicle.

4. In valve mechanism for controlling power actuators, the combination with a valve casing, of a diaphragm valve, a diaphragm engaging seat in said casing providing, when the diaphragm is seated, two compartments, one of which is provided with means for connecting it with a source of suction and the other of which is provided with means for connecting it with a power actuator, said diaphragm being provided with apertures for connecting said latter chamber with the atmosphere, a disc valve in said latter chamber having sealing portions for seating upon the diaphragm and disconnecting said chamber from the atmosphere, a valve actuating part connected with said diaphragm and disc valve, an initial resistance spring interposed between said valve actuating part and a part connected with the casing and holding the valve mechanism in released position, said valve actuating part being provided with means for connecting it with a part connected with the vehicle, and said casing being provided with means for connecting it with a physically operable part, for operating said valve mechanism by a pushing action.

5. In a brake system for automotive vehicles, the combination with a power actuator comprising a cylinder and a piston therein having means for connecting it with brake mechanism of controlling valve mechanism for the actuator comprising a casing, a diaphragm valve, said casing being provided with a diaphragm engaging seat forming an exterior suction chamber and an interior chamber separated therefrom when the diaphragm is seated, means for connecting the suction chamber with a source of suction, means for connecting said interior chamber with the actuator cylinder, said diaphragm being provided with apertures for connecting said interior chamber with the atmosphere, a disc valve in said interior chamber adapted to seat on said diaphragm and close said apertures therein, a valve actuating part connected with the central portions of said diaphragm and disc valve and extending through an aperture in the casing on the same side of the diaphragm as the suction chamber, sealing means for said aperture in the casing, a physically operable part, said casing and said valve actuating part being provided with means for connecting the one with said physically operable part and the other with brake mechanism of the vehicle operatively connected with said piston, the connections between the physically operable part and said valve mechanism being constructed to effect a pushing action.

6. In a brake system for automotive vehicles, the combination with a power actuator comprising a cylinder and a piston therein having means for connecting it with brake mechanism, of controlling valve mechanism for the actuator comprising a casing, a diaphragm valve, said casing being provided with a diaphragm engaging seat forming an exterior suction chamber and an interior chamber separated therefrom when the diaphragm is seated, means for connecting the suction chamber with a source of suction, means for connecting said interior chamber with the actuator cylinder, said diaphragm being provided with apertures for connecting said interior chamber with the atmosphere, a disc valve in said interior chamber adapted to seat on said diaphragm and close said apertures therein, a valve actuating part connected with the central portions of said diaphragm and disc valve and extending through an aperture in the casing on the same side of the diaphragm as the suction chamber, sealing means for said aperture in the casing, a physically operable part, said casing and said valve actuating part being provided with means for connecting the one with said physically operable part and the other with brake mechanism of the vehicle operatively connected with said piston, the connections between the physically operable part and said valve mechanism being constructed to effect a pushing action, and an initial resistance spring interposed between the valve actuating part and the part connected with the casing.

7. In a brake system for automotive vehicles, the combination with a power actuator comprising a cylinder and a piston therein having means for connecting it with brake mechanism, of controlling valve mechanism for the actuator comprising a casing, a diaphragm valve, said casing being provided with a diaphragm engaging seat forming an exterior suction chamber and an interior chamber separated therefrom when the diaphragm is seated, means for connecting the suction chamber with a source of suction, means for connecting said interior chamber with the actuator cylinder, said diaphragm being provided with apertures for connecting said interior chamber with the atmosphere, a disc valve in said interior chamber adapted to seat on said diaphragm and close said apertures therein, a valve actuating part connected with the central portions of said diaphragm and disc valve and extending through an aperture in the casing on the same side of the diaphragm as the suction chamber sealing means for said aperture in the casing, a physically operable part, said casing and said valve actuating part being provided with means for connecting the one with said physically operable part and the other with brake mechanism of the vehicle operatively connected with said piston, the connections between the physically operable part and said valve mechanism being constructed to effect a pushing action, and means for limiting the lost motion between the valve actuating part and the casing, to enable the operator to apply his physical force through the physically operable part to said brake mechanism.

8. In valve mechanism for controlling power actuators, the combination with a valve casing, of a diaphragm valve, a diaphragm engaging seat in said casing providing, when the diaphragm is seated, two compartments, one of which is provided with means for connecting it with a source of suction and the other of which is provided with means for connecting it with a power actuator, said diaphragm being provided with apertures for connecting said latter chamber with the atmosphere, a disc valve in said latter chamber having sealing portions for seating upon the diaphragm and disconnecting said chamber from the atmosphere, a valve actuating part connected with said diaphragm and disc valve, an initial resistance spring interposed between said valve actuating part and a part connected with the casing and holding the valve mechanism in released position, said valve casing and said valve actuating part being connected the one with a physically operable part and the other with brake mechanism of the vehicle, whereby a movement of the physically operable part will be transmitted through said spring to said brake mechanism to effect a partial operation of the same before operating the valve mechanism, and means for limiting the lost motion between the valve actuating part and the valve casing.

9. In a brake system for automotive vehicles, the combination with a power actuator comprising a cylinder and a piston therein having means for connecting it with brake mechanism, of controlling valve mechanism for the actuator comprising a casing, a diaphragm valve, said casing being provided with a diaphragm engaging seat forming an exterior suction chamber and an interior chamber separated therefrom when the diaphragm is seated, means for connecting the suction chamber with a source of suction, means for connecting said interior chamber with the actuator cylinder, said diaphragm being provided with apertures for connecting said interior chamber with the atmosphere, a disc valve in said interior chamber adapted to seat on said diaphragm and close said apertures therein, a valve actuating part connected with the central portions of said diaphragm and disc valve and having a stem portion extending through an aperture in the casing on the same side of the diaphragm as the suction chamber, sealing means for said aperture in the casing, a physically operable part, a connection from said valve casing to said physically operable part constructed to effect a pushing action on the valve casing, a connection from said stem portion of the valve actuating part to brake mechanism of the vehicle connected to said actuator piston, and means for limiting the lost motion between the valve actuating part and the casing.

10. In a brake system for automotive vehicles, the combination with a power actuator comprising a cylinder and a piston therein having means for connecting it with brake mechanism, of controlling valve mechanism for the actuator comprising a casing, a diaphragm valve, said casing being provided with a diaphragm engaging seat forming an exterior suction chamber and an interior chamber separated therefrom when the diaphragm is seated, means for connecting the suction chamber with a source of suction, means for connecting said interior chamber with the actuator cylinder, said diaphragm being provided with apertures for connecting said interior chamber with the atmosphere, a disc valve in said interior chamber adapted to seat on said diaphragm and close said apertures therein, a valve actuating part connected with the central portions of said diaphragm and disc valve and having a stem portion extending through an aperture in the casing on the same side of the diaphragm as the suction chamber, sealing means for said aperture in the casing, a physically operable part, a connection from said valve casing to said physically operable part constructed to effect a pushing action on the valve casing, a connection from said stem portion of the valve actuating part to brake mechanism of the vehicle connected to said actuator piston, and means for limiting the lost motion between the valve actuating part and the casing, and an initial resistance spring interposed between the valve actuating part and the casing, and tending to hold the valve mechanism in released position.

In testimony whereof we affix our signatures.

CALEB S. BRAGG.
VICTOR W. KLIESRATH.